(12) United States Patent
Speegle et al.

(10) Patent No.: US 9,319,104 B2
(45) Date of Patent: Apr. 19, 2016

(54) METHODS AND SYSTEMS FOR CONTROLLING DEVICES VIA POWER LINES

(71) Applicants: William H Speegle, Florence, AL (US); Remigius Shatas, Huntsville, AL (US)

(72) Inventors: William H Speegle, Florence, AL (US); Remigius Shatas, Huntsville, AL (US)

( * ) Notice: Subject to any disclaimer, the term of this patent is extended or adjusted under 35 U.S.C. 154(b) by 80 days.

(21) Appl. No.: 14/066,432

(22) Filed: Oct. 29, 2013

(65) Prior Publication Data
US 2014/0055250 A1    Feb. 27, 2014

Related U.S. Application Data

(63) Continuation of application No. 13/082,572, filed on Apr. 8, 2011, now Pat. No. 8,570,160.

(60) Provisional application No. 61/322,717, filed on Apr. 9, 2010, provisional application No. 61/395,445, filed on May 13, 2010.

(51) Int. Cl.
| | |
|---|---|
| *G05B 11/01* | (2006.01) |
| *G08C 19/12* | (2006.01) |
| *G08B 1/08* | (2006.01) |
| *H05B 37/00* | (2006.01) |
| *H04B 3/54* | (2006.01) |
| *H05B 39/08* | (2006.01) |
| *G08C 19/02* | (2006.01) |

(52) U.S. Cl.
CPC ............... *H04B 3/542* (2013.01); *G08C 19/02* (2013.01); *H05B 39/08* (2013.01); *H04B 2203/5408* (2013.01)

(58) Field of Classification Search
CPC ........... H04B 2203/5412; H04B 3/542; H04B 2203/5408; H05B 37/0263; H05B 33/0815; H05B 39/08; G06F 1/3203; Y02B 60/1285; G08C 19/02

USPC .......... 340/538, 12.32, 12.52, 13.22, 310.11, 340/310.17, 815.45, 855.8, 855.9, 10.1, 340/662, 661, 310.01, 956, 651, 3.3, 3.51, 340/572.7, 539.16, 539.17; 315/307, 308, 315/287, 291, 339, 362, 312, 318, 360, 297, 315/169.1; 307/1, 4, 15, 22, 23, 149, 82; 700/110, 3, 9, 11, 12, 17, 21, 22, 79, 700/83, 291, 293, 292, 286, 297, 300

See application file for complete search history.

(56) References Cited

U.S. PATENT DOCUMENTS 5,528,485 A * 6/1996 Devilbiss et al. ............... 363/89
6,239,732 B1  5/2001 Cusey (Continued)

FOREIGN PATENT DOCUMENTS

WO    WO 2004014510 A1 *  2/2004    ............. A63H 33/22

*Primary Examiner* — Mirza Alam
(74) *Attorney, Agent, or Firm* — Cynthia Rena Wright; Mark Clodfelter

(57) ABSTRACT

Methods and systems are provided that control devices using signals transmitted over power lines in many different applications and configurations. They provide a lower cost approach for controlling devices via signals transmitted over power lines. The methods and systems may control intensity, spectral, and other characteristics of lighting devices, such as light-emitting diodes (LEDs) or assemblies thereof, via power lines. They may also control other types of loads, such as motors, relays, valves or the like. Additionally, techniques for independently controlling intensity and spectral content of selected high efficiency lighting devices are also described. For example, the brightness and color of an LED may be controlled via the power lines that supply power to the LED.

16 Claims, 9 Drawing Sheets

(56) References Cited

U.S. PATENT DOCUMENTS

| | | | | |
|---|---|---|---|---|
| 6,792,337 | B2* | 9/2004 | Blackett | G01D 4/00 700/286 |
| 7,151,986 | B2* | 12/2006 | Rose | H02J 13/0096 246/28 E |
| 2002/0120878 | A1* | 8/2002 | Lapidus | G06F 1/3203 713/300 |
| 2007/0081130 | A1* | 4/2007 | May | H04N 5/7416 353/85 |
| 2009/0160627 | A1* | 6/2009 | Godbole | H04B 3/546 340/12.33 |
| 2009/0184662 | A1* | 7/2009 | Given et al. | 315/294 |
| 2009/0195168 | A1* | 8/2009 | Greenfeld | 315/192 |
| 2011/0068712 | A1* | 3/2011 | Young | 315/307 |
| 2011/0095687 | A1* | 4/2011 | Jonsson | 315/51 |

* cited by examiner

METHODS AND SYSTEMS FOR CONTROLLING DEVICES VIA POWER LINES

CROSS-REFERENCE TO RELATED APPLICATIONS

This application is related to and claims the benefit of U.S. Provisional Applications 61/322,717 and 61/395,445 both entitled "Methods and Systems for Controlling Devices via Power Lines" and which are both incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR JOINT INVENTOR

The inventors did not disclose the invention herein prior to the 12 month period preceding the filing of this nonprovisional application.

BACKGROUND OF THE INVENTION (1) Field of the Invention

The present invention relates generally to a method of communicating data by micro-modulation of the DC power supply voltage. Digital data is encoded in micro-modulation of the DC voltage between an electrical device and a microcontroller with which communication is to be established.

(2) Description of Related Art

There are a number of conventional methods and devices in commercial practice for transmitting signals over alternating current ("AC") power lines, particularly within households or commercial buildings, for use in controlling lights, appliances, and other devices, generally within the same building. Many of these methods involve modulating higher frequency signals (e.g. radio frequency (RF) signals) onto AC power lines that then travel the power lines where the higher frequency signals are received by a receiver and control device. Such techniques involve several additional circuits and devices and costs associated therewith. In some cases, the control and distance capabilities, and costs, are greater than what is required for many applications, such as controlling the intensity of lighting.

Current methods of modulating a DC power source between two voltages, such as 4 volts and 5 volts, are established in the prior art. One method of modulating a DC power source between two voltage levels is the use of a shunt regulator, which draws sufficient current from the source to cause the voltage to be reduced to the value of the referenced voltage. A shunt regulator is a one-way communication device, so multiple shunt regulators may be necessary for a particular application. If the reference voltage input to the shunt regulator is varied between 4 and 5 volts, then the voltage supplied to the microcontroller will be varied in the same manner. Likewise, any microcontroller being powered using a shunt regulator may also send data through the use of similar shunt regulator. When utilizing multiple shunt regulators, standard half-duplex protocols may be used to prevent collisions between multiple devices so that only one device is permitted to control the data transmitted at any one time. The use of shunt regulators increases the cost of production of an electrical device. And, the volume of each shunt regulator incorporated into a device may necessitate the increase in overall volume of the device and packaging for the electrical device.

The invention disclosed herein allows the transfer of digital data through the utilization of two non-zero DC voltage levels. The invention herein allows for the transmission of digital data while eliminating the need for one or more shunt regulators. The method herein utilizes the DC voltage that encodes the digital data to also function to power the microcontroller. The invention herein allows a significant reduction in the number of external components, such as required for implementation of competing prior art techniques. The reduction of external components, provides added value to the electrical device because of a reduction in the cost associated with manufacture of the electrical device, a reduction in the volume that must be packaged, and an increase in the reliability in performance of the electrical device. The external components required for the implementation of competing techniques may require a much larger volume than the microcontroller utilized in this method. And the cost of the microcontroller herein is significantly less than the costs of the external components required to communicate digital data in competing techniques known in the prior art.

Godbole (US 2009/0160627 A1) discloses the modulation of an alternating current and rectified alternating current, also known as pulsating direct current, by modifying phase angles to transmit data corresponding to control commands via a power line transmitting AC. In the Godbole method, control data is mapped to specific firing phase angles. For example, Godbole suggests mapping data to the set of 5°, 10°, 15°, and 20°. In one Godbole embodiment, a table in memory includes an association of firing phase angles to data bits, or of firing phase angles to specific commands. Godbole provides for the encoding of data in the firing phase angles of the rectified AC (pulsating DC) via voltage or current changes. AC and rectified AC are limited to just one phase modification per cycle, which occurs 60 times per second. Thus, the method of Godbole only permits encoding of data at a rate of 60 times per second. The method herein encodes data on small changes in non-zero voltage which is constant and not subject to phase modifications. The technique herein may be successfully applied at much higher frequencies that may exceed 75 KHz, or more than 1000 times faster than AC line frequency. The invention herein permits the encoding of potentially thousands of bits of data per second. Additionally, power surges or interruptions could lead in improper coding of data.

Lapidus (U.S. Pat. No. 7,058,823 B2) discloses system-on-a-chip and other large scale integrated circuit devices that are capable of operating at high frequencies while minimizing power consumption. Lapidus provides for devices that are capable of switching to a low power mode when high performance is not required. Lapidus provides for varying power supply voltage levels to reduce power consumption when high performance is not needed. Lapidus discloses a line driver for receiving an incoming data signal and transmitting an outgoing data signal on the signal line; (2) a power source for supplying a plurality of power voltage levels to a power supply rail of the line driver; and (3) a power level controller for determining a data rate of the outgoing data signal and in response to the determination, selectively applying one of the plurality of power voltage levels to the power supply rail fo the line driver to modify the amplitude fo the outgoing data signal. This patent is designed for use in an integrated circuit, using separate signal and power lines. Data is transmitted in Lapidus by the presence or absence of a signal level that can be changed as circumstances require. Lapidus differs significantly from the invention herein. In the device of Lapidus there is no correlation between the level of the signal and the transmitted data. In the present invention, the non-zero DC voltage level encodes the digital data.

Cusey (U.S. Pat. No. 6,239,732 B1) discloses an integrated circuit having analog to digital conversion circuitry capable of receiving a plurality of analog signals and converting them to a digital value. The digital value is then transmitted, upon request, over a single wire bus. The method of Cusy differs significantly from the invention herein. Cusey sends electrical power over a data line. While in this invention, data is sent over a power line.

BRIEF SUMMARY OF THE INVENTION

Disclosed herein is a method and system for controlling a device comprising varying a non-zero DC power voltage on a power line coupled to a device, and controlling said device based on encoded modulation of the non-zero DC power voltage.

Differing embodiments of the invention herein include a method for sending information over a power line comprising modulating a non-zero DC power voltage on the power line based on said information, and recovering the information from the modulation of the non-zero DC power source; sending information over a power line comprising a means for modulating a power voltage on the power line based on the sent information; and controlling a device via a power line comprising a microcontroller configured to receive a control signal and encode the control signal to a varying power voltage level. Additionally, a series of microcontrollers could be configured to decode varying non-zero DC power voltage levels to interpret a control signal and to control the device.

DETAILED DESCRIPTION OF THE INVENTION

Figure 1:
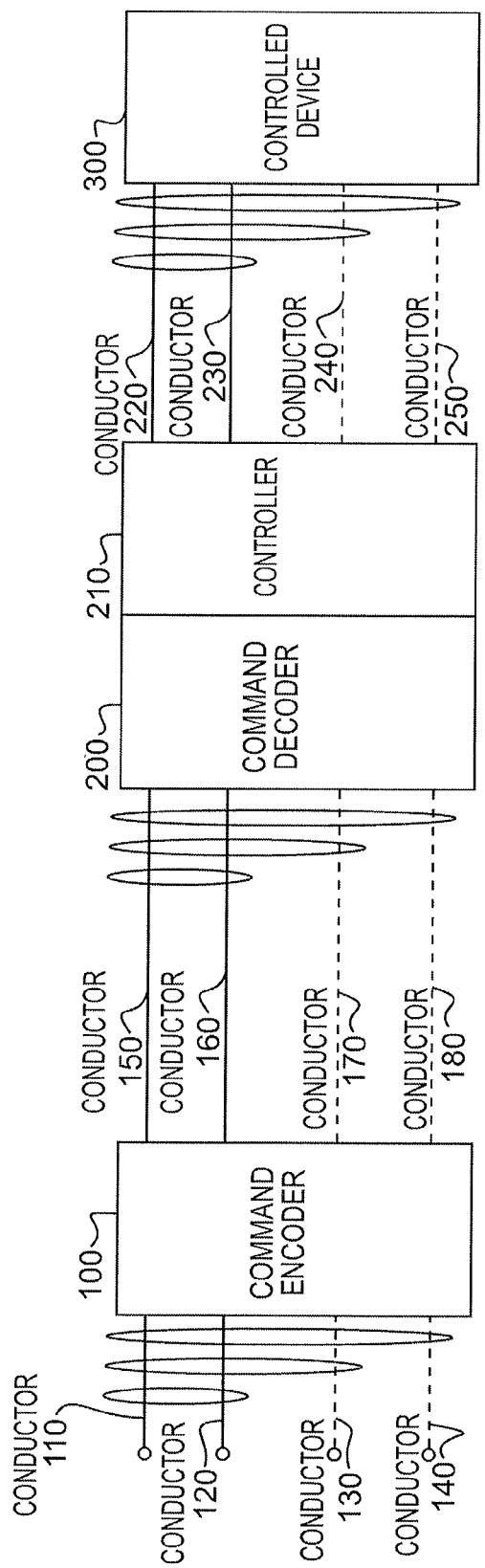
FIG. 1 illustrates an overview of an exemplary embodiment of an encoder and decoder consistent with the present invention.

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified ter. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Methods and systems in accordance with the present invention control devices using signals transmitted over power lines in many different applications and electrical configurations. They provide a lower cost approach for controlling devices via signals transmitted over power lines that is suitable for many situations. The methods and systems may control intensity, spectral, and other characteristics of lighting devices, such as light-emitting diodes (LEDs) or assemblies thereof, via power lines. In other embodiments, the methods and systems described herein may also control other types of loads, such as motors, relays, valves or the like. Methods and systems described herein are also well-suited for controlling lighting fixtures that use vertical cavity surface emitting lasers (VCSELs), and other solid state devices for providing lighting, and may also have application in controlling incandescent lights. Additionally, techniques for independently controlling intensity and spectral content of selected high efficiency lighting devices are also described. For example, the brightness and color of an LED array may be controlled via the power lines that supply power to the LED.

Although communication techniques disclosed herein have application in transmitting data for use in controlling electrical devices, methods and apparatus disclosed herein may also be used to support communication over power lines for other purposes. In some implementations, low cost hardware embodiments for implementing these methods for communication and control use microcontrollers that include integrated analog-to-digital converters that may be used for sampling voltage on power lines, and, using software implemented in such microcontrollers, for decoding command signals transmitted via power lines, and for controlling a load in response to commands represented by transmitted signals. In many applications where a microcontroller may already be useful for other purposes, low cost hardware changes to a circuit for providing a data reception and command decoding capability may include simply selection of a microcontroller, such as those of the ATMEL AVR family, having a capability to perform analog-to-digital sampling on one or more input circuits, and addition of a voltage divider, generally comprising two resistors, that reduced power voltage levels to levels that are generally within a dynamic range of such analog-to-digital converters in a selected microcontroller.

FIG. 1 illustrates an embodiment comprising an encode and decoder consistent with the present invention. Additional embodiments involving more complex electrical topologies and configurations may be implemented. Signal encoder 100 (also referred to herein as a command encoder) and signal decoder 200 (also referred to herein as a command decoder). Command encoder 100 may be powered via conductors 110 and 120. Command encoder 100 and command decoder 200 may be coupled via conductive paths 150 and 160, which may comprise a source and a return for DC current. Command decoder 200 may be coupled to controller 210 which uses information from decoded control signals to effect control of one or more controlled devices 300.

Embodiments of the invention herein may use a control signal encoder, which may include a user or data interface to generate and transmit control or other communications signals over power lines. Transmitted signals may employ an ASCII code or some other conventional, customized, or suitable code to convey commands and other information to one or more destination decoders, which may be coupled to a controller that may be used to implement decoded commands. In some embodiments, signal decoding functions and at least some controller functions may be implemented in a single microcontroller device.

In some embodiments, signal decoding functions and at least some controller functions may be implemented in a single microcontroller device. By sue of circuit designs and components that reduce power line voltage, at a sampling point, to a dynamic range acceptable for analog-to-digital converter circuits integrated within a microcontroller, such as a member of the ATMEL AVR microcontroller product line, signal decoding functionality may be implemented by use fo such analog-to-digital circuits and appropriate software, such as described later herein, implemented in such microcontroller.

There are several fundamental methods of communication over power lines encompassed herein. The low cost of embodiments implementing methods and apparatus disclosed herein is made possible through use of analog-to-digital converter capabilities included in selected microcontrollers used for decoding data signals transmitted over DC power lines and controlling a load in response to digital commands represented by such data. In many applications where one or more microcontrollers may already be present to implement commands transmitted and decoded via other conventional means, low cost is further realized since only a passive voltage divider circuit, frequently comprising only two resistors, need be added to reduce DC power line voltage to levels within a dynamic range of an analog-to-digital converter implemented within a suitable microcontroller, such as those of the ATMEL AVR family or similar microcontrollers from other vendors (e.g. Philips (NXP), On Semiconductor, Microchip, Renasas). Decoding of data transmitted over a DC power line may then be performed in software within such a microcontroller using results from analog-to-digital sampling of signals on DC power lines. In many embodiments, such a microcontroller is used to affect control of a load in response to decoded commands. In some embodiments, similar or other types of microcontrollers may also be used to encode command signals and control transmission of such signals on DC power lines, as described here in detail.

The method herein is referred to as DC voltage micromodulation, wherein data is transmitted by momentarily changing magnitudes of non-zero DC voltage supplied to a load in order to encode information according to some preselected code. In this method, a control command encoder 100 causes temporary increases (or decreases) in non-zero DC voltage supplied via power conductors 150-160 according to selected command codes. In an example shown herein, data is transferred through use of ASCII-compatible code sequences for selected characters, but other conventional or customized code sequences may also be used instead of or in addition to ASCII-compatible code sequences. Use of ASCII code sequences for commands provides a degree of noise immunity and reduces the likelihood of false positive commands compared to the use of shorter code sequences. However, shorter or longer codes may be used depending upon a noise environment for an application, criticality of correct command receipt, latency, and other requirements for a particular application. When using ASCII code sequences, an occurrence of a voltage above a static level, by more than a programmable threshold quantity, may be interpreted by a receiving microcontroller to represent an ASCII start bit. Thereafter, data signals may follow ASCII standard with transmission of 8 data bits, Least Significant Bit (LSB) first, and one stop bit, with no parity bits. In this example, data transmission may be signaled by varying voltage from a nominal supply value, such as 15V, to a signaling value, such as 19V. In general, a range of variance may be from about 10% to about 30% of the non-zero DC voltage, although this range depends on several factors. Where the voltage is closely controlled and relatively free of noise, a smaller range may be used, such as 5% or so, or even less. In an extremely noisy environment or where there are large voltage swings, a larger range may be used, such as 30% to 50% or more. Modulation voltage swings due to data transmission should be selected so as to not interfere with the operation of the device or devices powered by the modulated DC voltage.

When line voltage drops at a receiving microcontroller are sufficiently small and relatively noise free, data may be recovered using a simple threshold test to determine if voltage has exceeded a threshold value at one or more sampling times. In a noisy environment, multiple samples may be integrated or averaged over a selected sampling interval to determine if a threshold has been exceeded. In an environment where there is increased line voltage drop and/or switching noise, an adaptive algorithm that uses multiple samples to look for changes in integrated level, or other known techniques for signal recovery, may be used in place of a simple threshold test using single or multiple samples.

Command functions may include any desired response and any length character string in any format. An example would the use of an ASCII code for characters "U", "D", "W" and "C" to execute functions, respectively, of "Up", to increase the brightness of an LED or the speed of a motor, "Down" to decrease brightness or speed, "Warmer" to change color temperature of an LED light fixture to a lower (i.e., redder) color temperature, and "Cooler" to increase color temperature (i.e., to include more of the blue portion of the light spectrum). As noted, other conventional or customized codes may be used to provide commands to be transmitted and decoded by a receiving microcontroller or other device.

Figure 2:
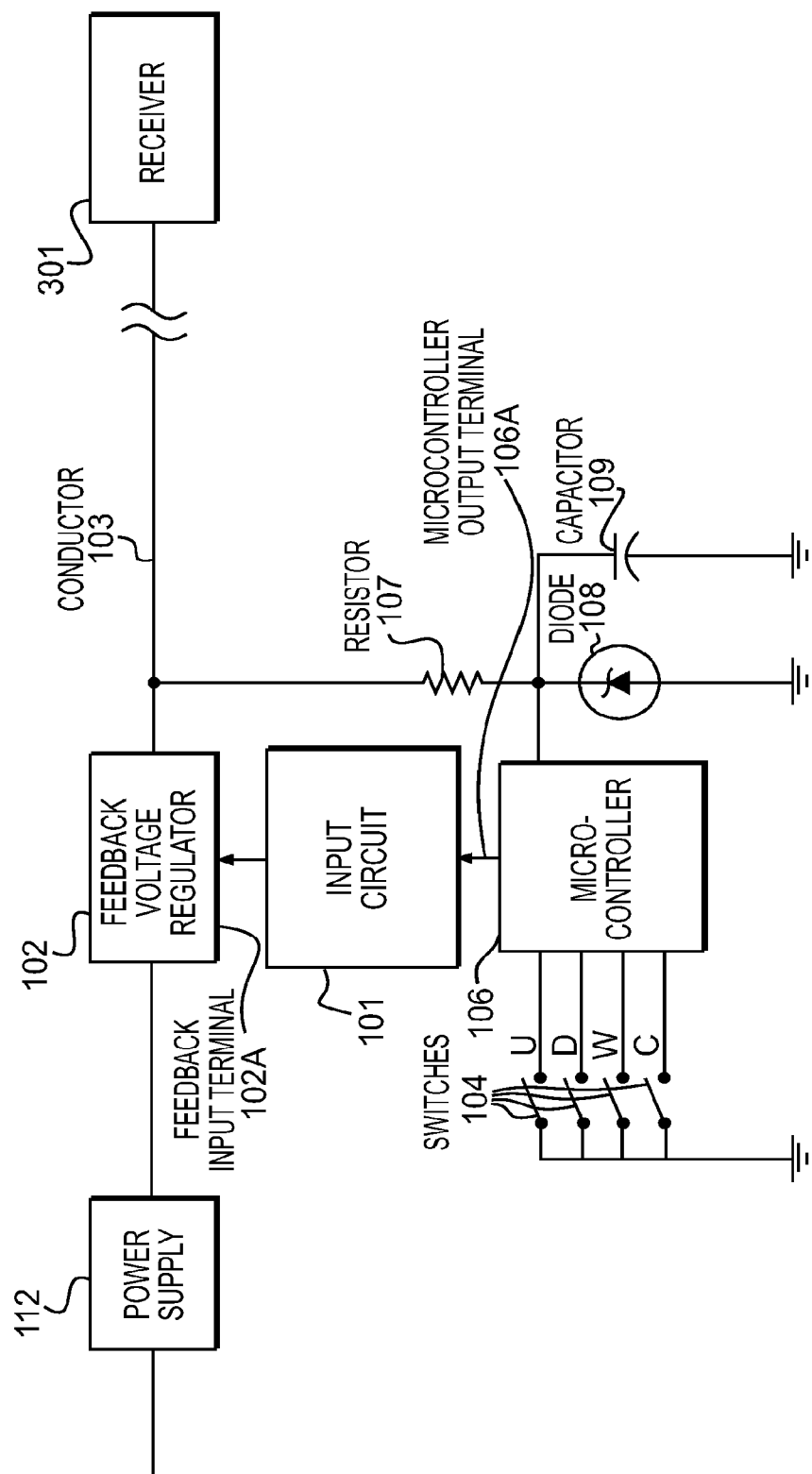
FIG. 2 depicts a circuit that may be used to generate and transmit encoded signal sequences representing desired commands by modulating non-zero voltage on a DC power conductor used to provide DC power to a load to be controlled via commands from a controller.
Figure 3:
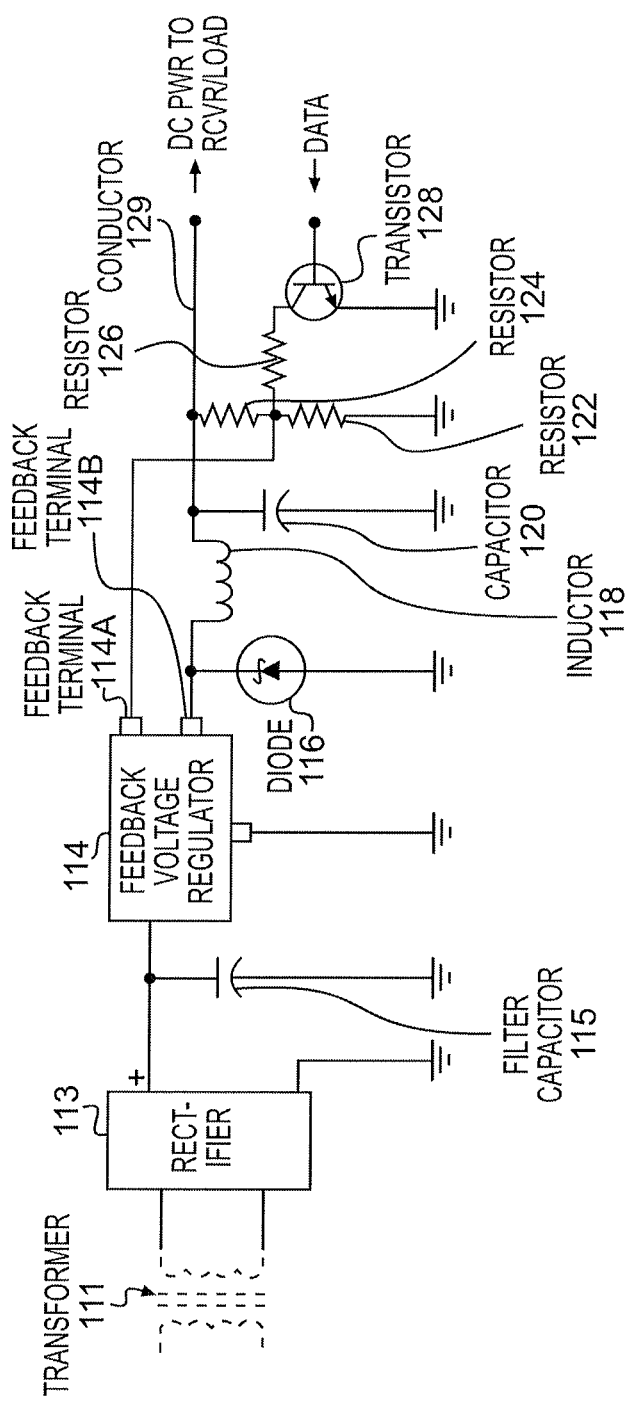
FIG. 3 illustrates a circuit that may be used to accept data, which may comprise control commands, and encode data for transmission on DC power lines.

FIGS. 2 and 3 illustrate a method for data transmission over DC power lines. FIG. 2 depicts an overview of a circuit that may be used to generate and transmit encoded signal sequences representing desired commands by modulating non-zero voltage on a DC power conductor used to provide DC power to a controlled device 300 to be controlled via commands from controller 210. FIG. 2 illustrates a DC power supply 112 providing DC voltage to a feedback voltage regulator 102, such as a LM2592HV from National Semiconductor, which provides a regulated voltage output to controlled device 300 including a receiver and command decoder 301. Command decoder 301 receives, decodes, and implements responses to received commands. In this embodiment, microcontroller 106 receives power via a circuit comprised of resistor 107, Zener diode 108, and capacitor 109. Capacitor 109 provides power to microcontroller 106 at an appropriate input power voltage. Microcontroller 106 receives command input from a user via switch(es) 104. Switch(es) 104 may be momentary contact switches. And, each switch 104 may be coupled to a different input terminal to microcontroller 106 so that a momentary closure of switch 104 may be interpreted by software executing within microcontroller 106 to represent a desired input command from a user.

In FIG. 2, each switch 104 input to microcontroller 106 may represent an Up ("U"), Down ("D"), "Warmer" ("W"), or Cooler ("C") command. For example, pressing on the switch 104 representing an Up ("U") controls the intensity of an Led light fixture. Such a circuit may employ pull-up resistors that are currently available in many microcontrollers for each switch input circuit. In this embodiment, momentary contact switch 104 may be an independent switch or may be paired on simple rocker switches or on a multidirectional rocker switch so that "U" and "D" are paired on a simple rocker switch or on a multi-directional switch (up and down or left and right). In a multi-directional switch, "W" and "C" may be paired on a simple rocker switch or on a multi-directional switch.

Software within microcontroller 106 may employ an analog-to-digital sampling capability on selected microcontroller input circuits to detect closure of a particular switch 104. Alternatively, software may use a simple state change on a microcontroller input to detect which switch 104 has been closed, therefore, indicating which command is to be encoded and transmitted. Software executing within microcontroller 106 may then use stored values for ASCII character code sequences or other code corresponding to possible input commands selectable via user closure of input switch 104. The selected ASCII character code sequence is used to turn on and off microcontroller 106 output terminal 106A in order to generate pulses corresponding to a selected ASCII character code sequence or other code. These pulses transmit ASCII characters. A sample code sequence may include a start bit, followed by an 8 bit sequence for an ASCII character with the least significant bit transmitted first, followed by a stop bit. Output terminal 106A is coupled to a feedback input terminal 102A on feedback voltage regulator 102 via input circuit 101. This configuration causes regulator 102 to momentarily increase and decrease output voltage being supplied to receiver 301 in response to perceived voltage changes on input terminal 102A. Input circuit 101 may be a data input circuit that includes transistor 128 as shown in FIG. 3. Part LM2592HV from National Semiconductor may be utilized as feedback voltage regulator 102. Since the response time of feedback voltage regulator 102 is on the order of a few microseconds, the timing of variations in the output voltage closely resembles the ASCII code sequence used to derive microcontroller commands to microcontroller output terminal 106A. Microcontroller output terminal 106A is coupled via input terminal 102A to feedback regulator 102.

Various conventional or customized code sequences may be used to transfer information using communications methods and apparatus consistent with the present invention. Code sequences are used to drive voltage regulator 102 (shown in FIG. 2) or voltage regulator 114 (shown in FIG. 3) in order to modulate DC voltage on DC power lines and transmit data to receiver 301 (shown in FIG. 2) and transistor 128 (shown in FIG. 3). Signal sequences utilized to drive voltage regulator 102/114 may be generated using a standard UART (Universal Asynchronous Receiver/Transmitter) or USART (Universal Synchronous/Asychronous Receiver/Transmitter) function that may be implement in either hardware or software. If microcontroller 106 is from ATMEL's AVR family lacking internal hardware for UART or USART circuit, the coding sequence may be implemented using conventional algorithms and coding techniques. If microcontroller 106 is an ATMEL AVR ATmega 16 microcontroller lacking internal USART circuit hardware, code may be generated using ASCII character signal sequences or code may be generated by implementing software.

FIG. 3 depicts a circuit that may be used to accept digital data. This digital data may comprise control commands and encode said digital data for transmission on DC power lines.

Conventional inductor 118 and capacitor 120 filter the circuit and Schottky diode 116 and voltage regulator 114 provide DC power voltage via conductor 129 to a data receiver (RCVR/LOAD in FIG. 3). Data to be transmitted may be input via transistor 128 and resistor 126 via a voltage divider comprising resistors 122 and 124, which are selected to provide a voltage range suitable for input into feedback terminal 114A of feedback voltage regulator 114. Input data may be ASCII character codes or other digital data to be transmitted via DC power voltage conductor 129. Feedback voltage regulator 114 responds to voltage changes at feedback terminal 114A caused by data introduced at transistor 128 and cause the modulation of power supply voltage that can be detected and decoded by a receiver, decoder, or controller unit.

Figure 4A:
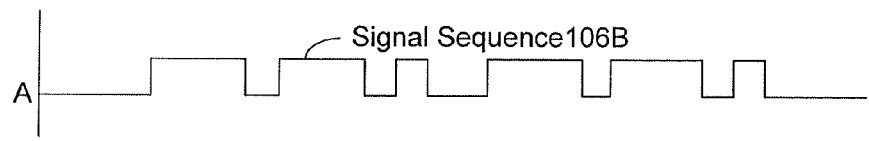
FIGS. 4A-4G illustrate exemplary DC voltage signal sequences which may be transmitted in accordance with methods and systems consistent with the present invention.
Figure 4B:
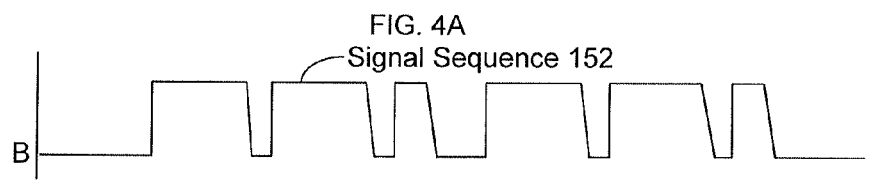
Figure 4C:
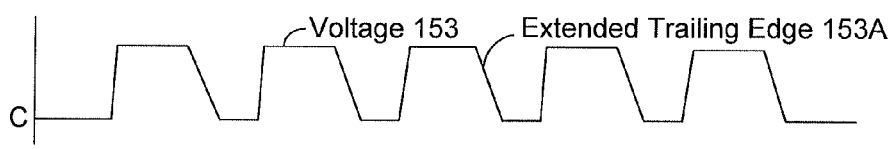
Figure 4D:
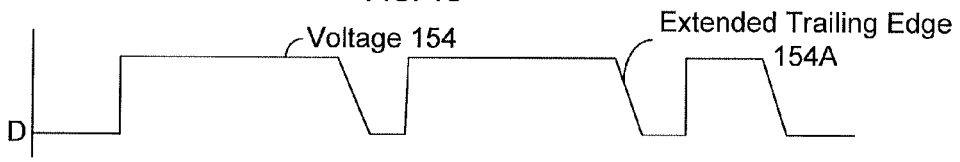
Figure 4E:
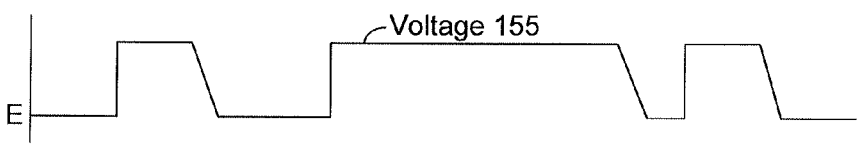
Figure 4F:
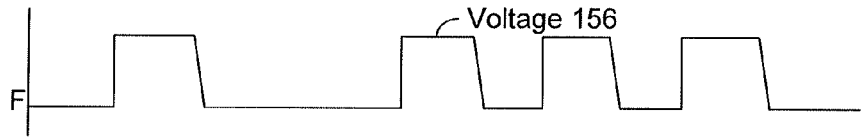
Figure 4G:
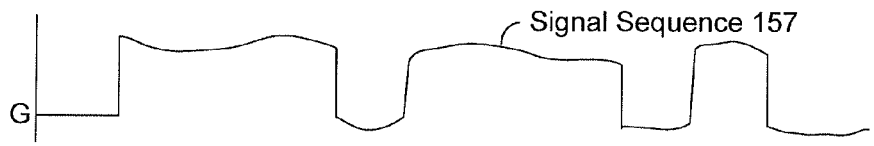

FIG. 4A depicts representative signal sequence 106B transmitting ASCII code for "D" that may be generated from microcontroller output terminal 106A. Signal sequence 152 is shown in FIG. 4B. Signal sequence 152 represents two transmissions of "D" per ASCII code. ASCII code sequence "D" may be impressed on conductor 103 (shown in FIG. 2) by feedback voltage regulator 102 as a result of injection of signal 106B to input terminal 102A via input circuit 101. Signal sequences 153, 154, 155, and 156 are shown in FIGS. 4C through 4E. Signal sequences 153, 154, 155, and 156 are representative os oscilloscope traces recorded from conductor 103 (shown in FIG. 2) when receiver 301 (shown in FIG. 2) and its associated load are operating at a relatively low percentage of maximum power level. Signal sequence 157, shown in FIG. 4G is representative of a scope trace recorded from conductor 103 (shown in FIG. 2) when receiver 301 (shown in FIG. 2) and its associated load are operating near maximum power levels. FIGS. 4C through 4G a Non-Return-to-Zero, Inverted (NRZI) modulation technique is used. But other conventional or customized modulation techniques may be employed.

Figure 5:
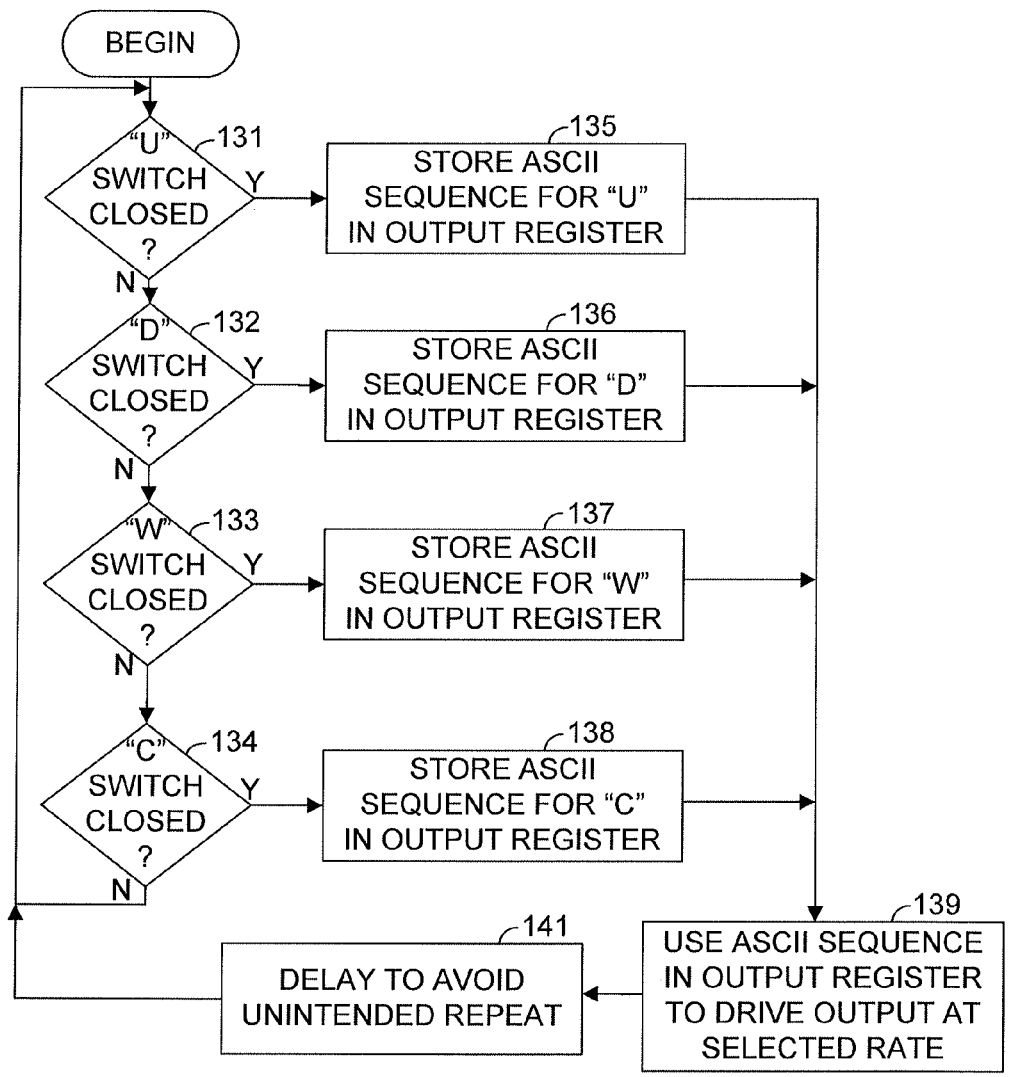
FIG. 5 illustrates software which may be installed and executed on a microcontroller to respond to closure of a selected momentary contact switch by a user and generate appropriate ASCII character signal sequences in response to such closure.

FIG. 5 is a flowchart illustrating software steps that may be installed and executed on microcontroller 106. FIG. 5 depict the embodiment shown in FIG. 2 responding to closure of a selected momentary contact switch 104. When energized microcontroller 106 begins executing a software loop that consistently checks input terminals at steps 131, 132, 133, and 134 ("U" Switch Closed, "D" Switch Closed, "W" Switch Closed, and "C" Switch Closed, respectively) to determine if switch 104 has been closed by a user. When microcontroller 106 detects the closure of switch 104, a bit sequence for a corresponding ASCII character is generated or retrieved from memory at one of steps 135, 136, 137, or 138 ("U", "D", "W", and "C", respectively). Step 139 uses a stored bit sequence for a selected ASCII character to drive microcontroller output terminal 106A (FIG. 2) to create a corresponding ASCII character signal sequence at a selected baud rate. Most applications will require a baud rate of 110 symbols per second. But a faster of slower baud rate may be used depending upon application requirements and overall circuit design. Delay interval 141 may be selected to give a user an opportunity to release a switch to prevent unintended repeats of a selected command.

Figure 6:
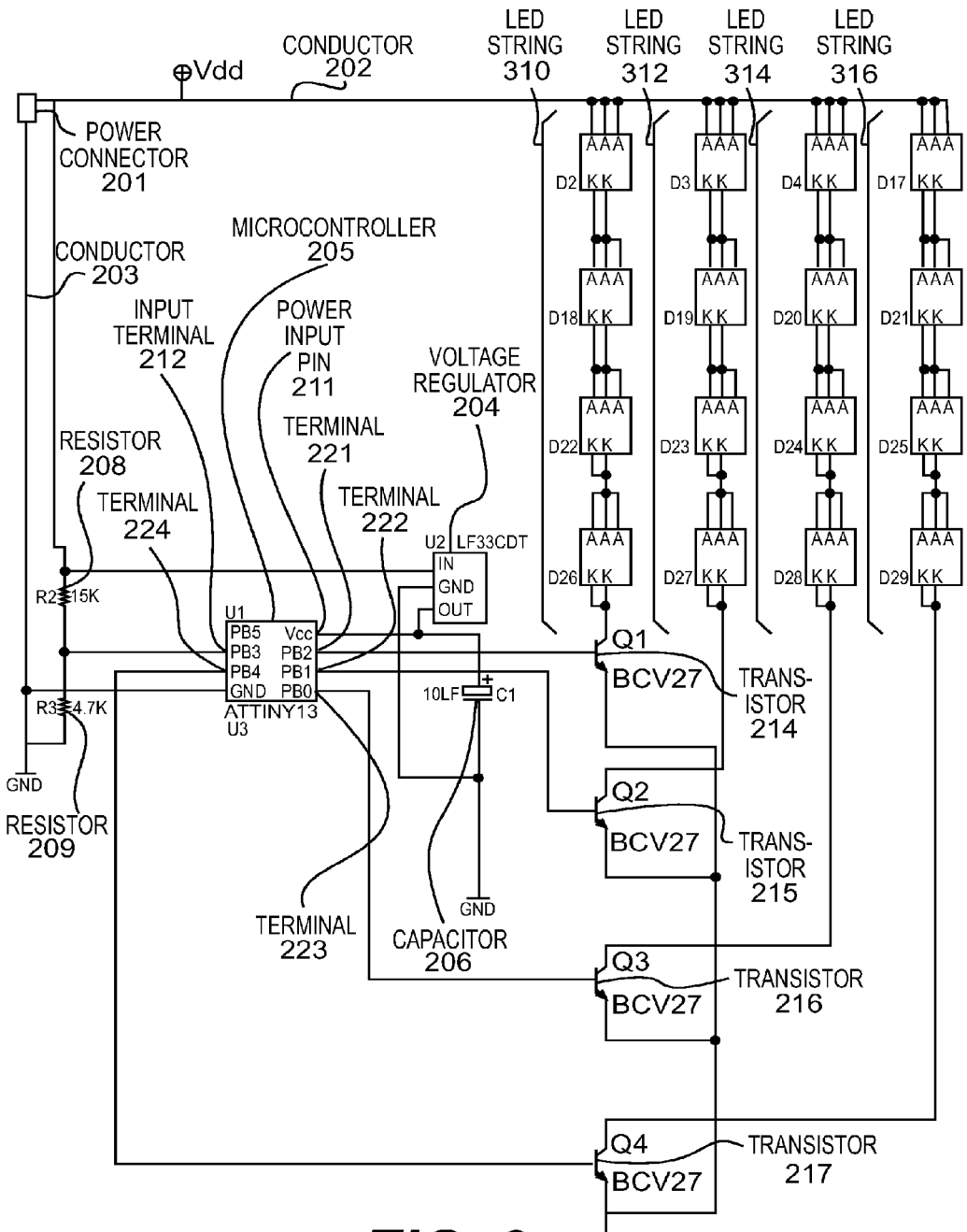
FIG. 6 depicts a schematic of an example of a circuit to detect and decode data modulations created by circuits received over a DC power line, and also control signals in response to decoded commands.

FIG. 6 depicts a circuit that may be used to detect and decode data modulations created by circuits such as those illustrated in FIGS. 2 and 3. The circuit depicted in FIG. 6 may be implemented using a microcontroller located near controlled device 300. Controlled device 300 is controlled in response to command s transmitted over DC power lines. DC power voltage enters the circuit via power connector 201, which supplies a positive voltage to conductor 202, and is grounded via conductor 203. Voltage regulator 204 and capacitor 206 provide regulated supply voltage to power input pin 211 of microcontroller 205. Microcontroller 205 may be an Attiny 13A microcontroller from the ATMEL AVR product line, or from a similar microcontroller having integral analog-to-digital sampling capability on at least one input terminal. Some embodiments may employ a separate microcontroller or other electronic device to provide an analog-to-digital converter capability. Any separate microcontroller may be coupled to microcontroller 205 via a port configured to receive serial data. Resistors 208 and 209 comprise a voltage divider, with resistance values selected to reduce voltage supplied via conductor 202 to a voltage range compatible with input terminal 212. Input terminal 212 includes analog-to-digital sampling capability.

Methods for communication over DC power lines as disclosed herein may be extended with benefit to many different applications and embodiments. For example, multiple microcontrollers may be used to independently control, either directly or via associated power transistors, intensity of three separate LEDs, or other light emitting devices, wherein each of the three light emitting devices emits light of a different color. Such light emitting devices may then be grouped so as to provide a single pixel in a large display or sign such as a billboard or other signage, or to create a mural on a wall. Microcontrollers may be configured in a grid containing multiple rows of microcontrollers with said grid being provided with power via a common wire par or power buss. Each microcontroller is such a grid may be assigned an address code based on its relative position within the grid The address may be stored in retained memory in each microcontroller in such grid so that each microcontroller may be programmed to recognize its address code in order to control it via commands coded as bits, words, or characters.

Figure 7A:
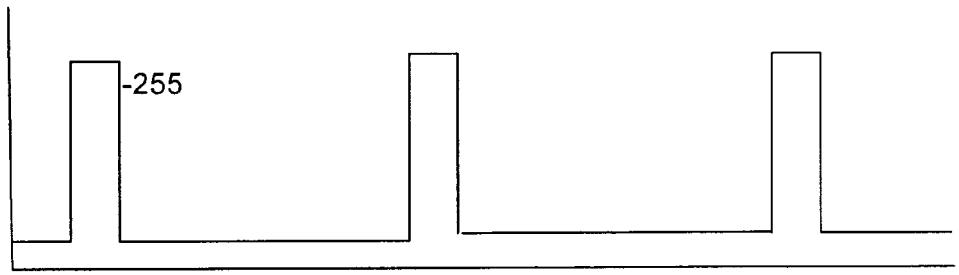
FIGS. 7A-7C illustrate one method by which voltage from an output terminal of a microcontroller is affected by pulse width modulation in accordance with methods and systems consistent with the present invention.
Figure 7B:
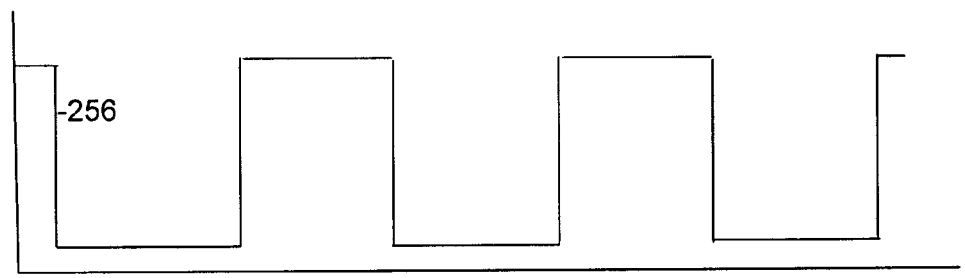
Figure 7C:
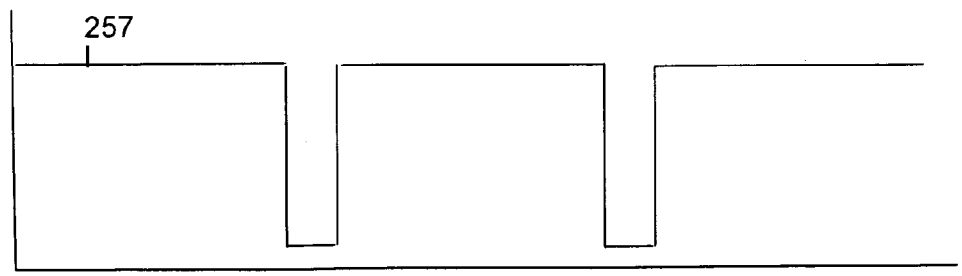

FIGS. 7A, 7B, and 7C depict how a voltage from an output terminal of microcontroller 106 is affected by pulse width modulation. Pulse width is controlled by a value of a pulse width modulation ("PWM") variable associated with a particular microcontroller output terminal 106A (as shown in FIG. 2). FIG. 7A illustrates an energized output terminal. When a lop counter register overflows, the output voltage increases as shown in 255 of an oscilloscope trace of output voltage. When a loop counter exceeds PMW value associated with a particular load, then microcontroller output terminal 106A (as shown in FIG. 2) is turned off until a loop counter overflows again. In FIG. 7A, when the microcontoller output terminal 106A is operated in a pulse width modulation mode, output voltage is switched "ON" at the beginning of each loop counter overflow cycle and switched "OFF" when a loop counter exceeds a value of a PWM variable associated with the microcontroller output terminal 106A. FIGS. 7A, 7B and 7C depict how the portion of each power cycle may be controlled by increasing values of a PWM variable associated with a particular load. Voltage trace 256 in FIG. 7B shows a duty cycle of approximately 60 percent, while voltage trace 257 in FIG. 7C shows a duty cycle of approximately 90 percent. Particular values are used for incrementing and incrementally reducing PWM variables.

Figure 8:
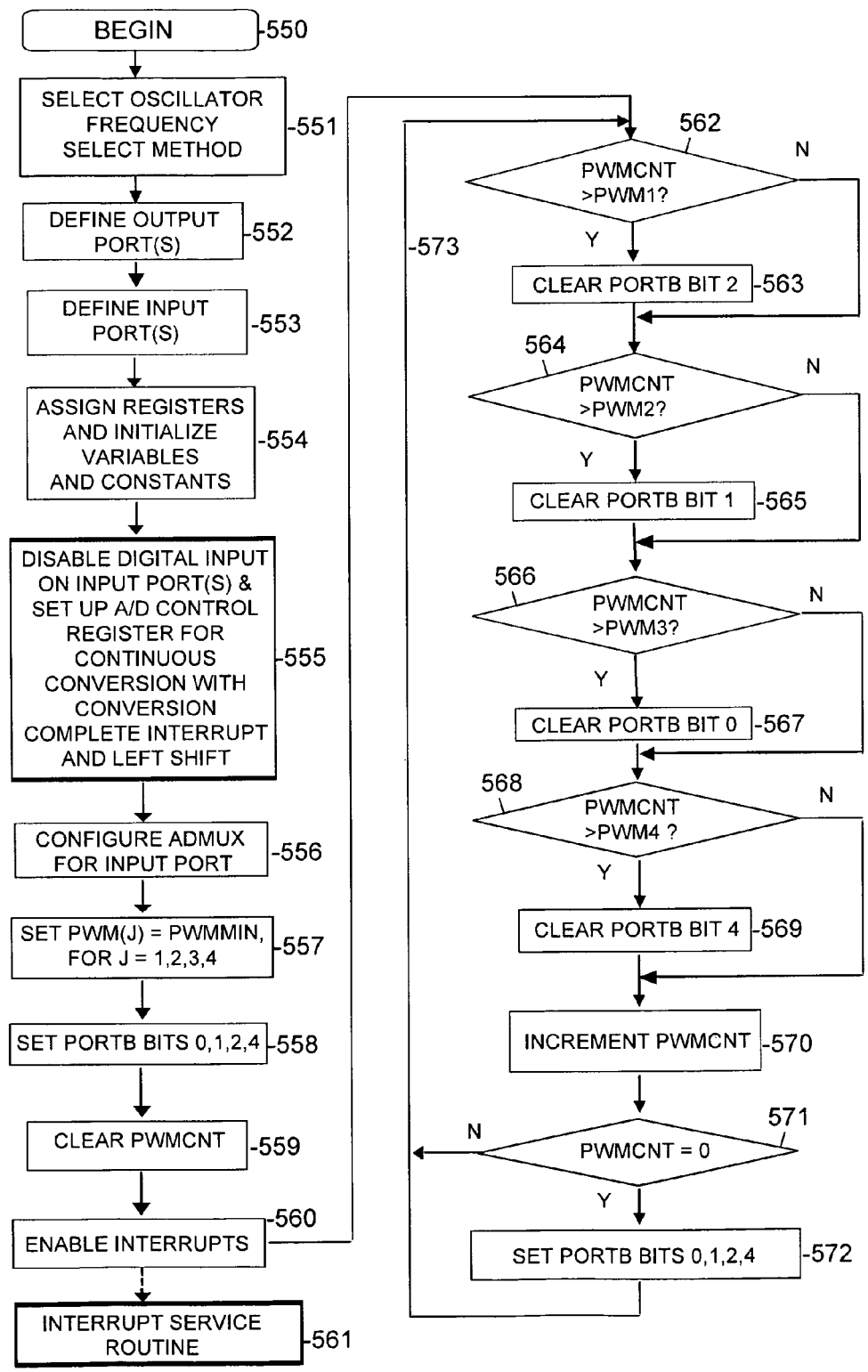
FIG. 8 depicts an exemplary embodiment of software steps which may be implemented into a microcontroller as a main program to perform setup and configuration functions and to implement a loop that controls pulse width modulation of multiple loads.

FIG. 8 is a flowchart depicting an example of software that may be implemented in microcontroller 106 to program said microcontroller to perform setup and configuration functions, and to implement a loop that controls pulse width modulation of multiple loads. This flowchart may be used to program microcontroller 106 pursuant to the circuit shown in FIG. 6. At step 551 an oscillator frequency is selected for microcontroller 106. In many embodiments, programming selections may be made and loaded during programming of a microcontroller for a particular application. Software capable of processing the method depicted in FIG. 8 may be loaded and stored in a microcontroller during manufacture of a electrical device, such as a light fixture, employing a communications Method, and selection of a Method to be used in a particular application may be made later, during assembly or installation). In other embodiments, a particular Method may be selected and only the software needed to implement that Method may be loaded and stored in a microcontroller to e used for a particular application.

At step 552 of FIG. 8, one or more output ports for a selected application are selected and properties defined as typically indicated in a data sheet for a selected mircocontroller. At step 553, input ports for a selected application and selected circuit configuration are selected and properties defined. If a receiver circuit is adequate for a selected Method, one input port may be adequate, and may be configured via property selection per a microcontroller data sheet to use an integral analog-to-digital conversion capability. If a selected Method requires two input ports so that integrals may be performed on both positive and negative half-cycles, a receiver circuit may be used, and two input ports may be defined at step 553. At step 554, registers are assigned and variables and constants are initialized. These include initializing variable DATAPRESENT, SAMPLE COUNT (or SAMPLE COUNT1 and SAMPLE COUNT 2, depending on the embodiment), POSITIVE SUM, NEGATIVE SUM, and START to "0" and MODE equal to "1". At step 555 input port(s) are further defined to disable digital inputs, enable analog-to-digital conversion capabilities, and set up an analog-to-digital control register for continuous conversion with Conversion Complete Interrupt and a left shift in analog-to-digital conversion results registers. In step 556, an analog-to-digital multiplexer control register ADMUX is configured to initially select an input terminal, which in an example embodiment is configured for a terminal that samples positive half-cycles. At step 557, pulse width modulation variables PWM(J) are initialized to their respective minimum values for each of four output terminals and loads. At step 558, selected bits are st in PORT B in order to energize selected output ports. A loop counter, step 559, PWMCNT that is used to help control pulse width modulation intervals is set to zero. Interrupts are enable at step 560. An example of an interrupt includes Analog-to-Digital Conversion Complete Interrupts. Interrupts are serviced by and interrupt service routine 561. Step 562 is an initial step in loop 573, which is used to control pulse width modulation intervals for each output port.

Figure 9:
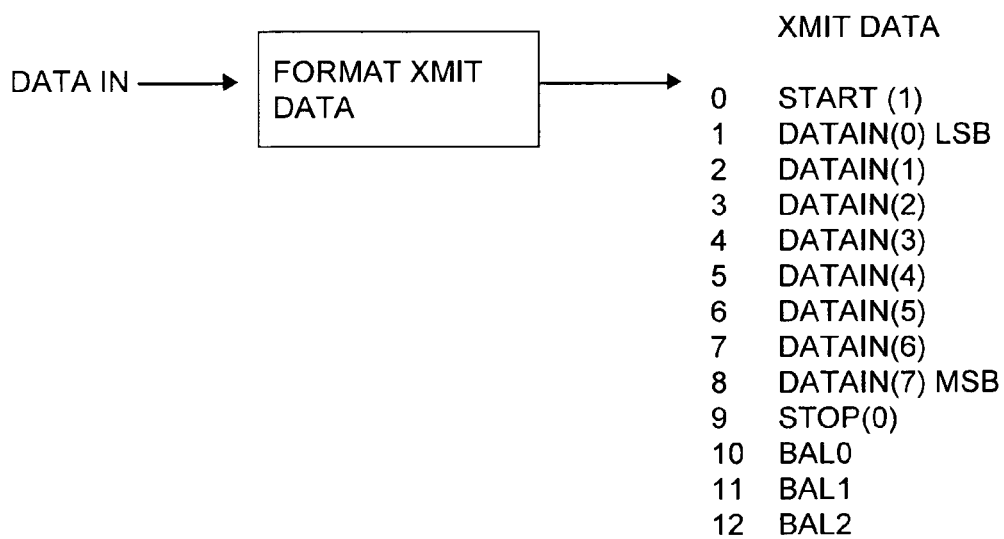
FIG. 9 illustrates an exemplary embodiment of ASCII data formatting.

FIG. 9 depicts a representative data formatting routine 900 that may be used to accept input data and convert it to a bit sequence that is ready to transmit. The data formatting routine 900 includes balancing bits for those Methods and applications that use charge balancing. Charge balancing bits are selected so that the number of "0's" and "1's" are equal after transmission of ASCII character plus charge balancing bits.

The invention claimed is:

1. A method for controlling one or more electrical devices powered by a DC power square wave comprising:
    encoding said DC power square wave such that changes in increase and decrease in DC power voltage along the square wave encodes digital data, wherein said digital data comprises an ASCII-compatible code wherein a voltage above a static level interpreted to represent an ASCII start bit, and data signals follow ASCII standard with transmission of 8 data bits, least significant bit first, and one stop bit, with no parity bits, so that data transmission signaled by varying voltage from a nominal supply value to a signaling value,
    encoding a plurality of modulations of said nominal DC power voltage to form said ASCII-compatible code, with a plurality of so-encoded said ASCII-compatible code sequences forming a command set for controlling operation of said device, each said ASCII-compatible code sequence of said command set associated with a different, discrete operational parameter of said device,
    operating said device using an encoded DC power square wave,
    changing operation of said device in accordance with a decoded said ASCII-compatible code sequence;
    wherein microcontrollers used for decoding data signals transmitted over DC power lines and controlling a load in response to decoded commands represented by ASCII-compatible code data.

2. The method of claim 1 further comprising remotely generating said control signals from said one or more electrical devices.

3. The method of claim 1 further comprising modulating said DC power voltage in accordance with said electrical signals while said one or more electrical devices are operating.

4. The method of claim 1 further comprising controlling at least one of an operating electrical motor and an energized illumination device while modulating said DC power voltage in accordance with said control signals.

5. The method of claim 4 wherein said controlling said operating electrical motor further comprises varying a speed of said operating electrical motor.

6. The method of claim 1 wherein said varying a DC power voltage responsive to said one or more control signals further comprises varying said DC power voltage in accordance with a predetermined code.

7. The method of claim 6 wherein said varying a DC power voltage in accordance with a predetermined code further comprises varying said DC power voltage in accordance with an ASCII code.

8. A method for sending digital data over a DC power line powering a device comprising:
    wherein said digital data comprises an ASCII-compatible code wherein a voltage above a static level interpreted to represent an ASCII start bit, and data signals follow ASCII standard with transmission of 8 data bits, least significant bit first, and one stop bit, with no parity bits, so that data transmission signaled by varying voltage from a nominal supply value to a signaling value,
    wherein microcontroller assigned an address code based on relative position within the grid so that microcontroller programmed to recognize address code in order to control via commands coded as bits, words, or characters; and
    modulating an existing DC power square wave of a non-zero DC power voltage on said power line in accordance with said digital data, without said DC power square wave falling to or passing through zero volts, and without interfering with operation of said device powered by said non-zero modulated DC square wave voltage,
    detecting modulated levels of said non-zero DC voltage, and
    recovering said data by detecting modulations of said non-zero modulated DC voltage;
    wherein data recovered using threshold test to determine if voltage exceeded a threshold value at one or more sampling times; and
    wherein microcontrollers used for decoding data signals transmitted over DC power lines and controlling a load in response to decoded commands represented by ASCII-compatible code data.

9. The method of claim 8 wherein said modulating an existing non-zero DC power voltage in a digital manner further comprises using a power voltage regulator to modulate said existing non-zero DC voltage level.

10. A system that transmits digital data comprising:
an electronic device that transmits digital data via a modulated non-zero DC power voltage square wave;
wherein said digital data comprises an ASCII-compatible code wherein a voltage above a static level interpreted to represent an ASCII start bit, and data signals follow ASCII standard with transmission of 8 data bits, least significant bit first, and one stop bit, with no parity bits, so that data transmission signaled by varying voltage from a nominal supply value to a signaling value;
wherein microcontroller assigned an address code based on relative position within the grid so that microcontroller programmed to recognize address code in order to control via commands coded as bits, words, or characters; and
the microcontroller that receives said digital data transmitted from said electronic device; and
one or more power lines that transmit said digital data from said electronic device to said microcontroller;
wherein data recovered using threshold test to determine if voltage exceeded a threshold value at one or more sampling times;
wherein said digital data is encoded in changes in said modulated non-zero DC power voltage; and
wherein microcontrollers used for decoding data signals transmitted over DC power lines and controlling a load in response to decoded commands represented by ASCII-compatible code data.

11. The system of claim 10 further comprising remotely generating the transmission of said digital data from said electronic device to said microcontroller.

12. The system of claim 10 wherein said electronic device is an electrical motor.

13. The system of claim 10 wherein said electronic device is an illumination device.

14. The system of claim 13 further comprising varying intensity level and color spectrum of said illumination device.

15. The system of claim 10 further comprising varying said modulated non-zero DC voltage square wave in accordance with a predetermined code.

16. The method of claim 1 wherein a point near the nominal DC voltage along the square wave is designated as a digital "1" and a change from said nominal DC power voltage along the square waves as a digital "0".

* * * * *